United States Patent [19]
Fuse

[11] Patent Number: 4,845,519
[45] Date of Patent: Jul. 4, 1989

[54] IMPROVED PRINTER ENABLING CONCURRENT WRITING, TRANSFERRING, AND FIXING OPERATIONS ON THE SAME SHEET OF RECORDING MATERIAL

[75] Inventor: Masashi Fuse, Morioka, Japan

[73] Assignee: Alps Electric Co., Ltd., Japan

[21] Appl. No.: 139,278

[22] Filed: Dec. 29, 1987

[30] Foreign Application Priority Data

| | | | |
|---|---|---|---|
| Apr. 6, 1987 | [JP] | Japan | 62-84045 |
| Apr. 6, 1987 | [JP] | Japan | 62-84046 |
| Apr. 6, 1987 | [JP] | Japan | 62-84047 |
| Apr. 6, 1987 | [JP] | Japan | 62-84048 |
| Apr. 6, 1987 | [JP] | Japan | 62-84049 |
| Apr. 6, 1987 | [JP] | Japan | 62-84050 |
| Apr. 6, 1987 | [JP] | Japan | 62-84051 |

[51] Int. Cl.$^4$ .................. G01D 15/06; G03G 15/22
[52] U.S. Cl. .................. 346/153.1; 355/212
[58] Field of Search .................. 355/3 R, 3 BE, 3 FU, 355/16; 346/153.1, 155, 160

[56] References Cited

U.S. PATENT DOCUMENTS

| | | | |
|---|---|---|---|
| 3,574,455 | 4/1971 | Mix et al. | 355/3 R |
| 3,788,203 | 1/1974 | Rhodes | 355/16 X |
| 3,843,252 | 10/1974 | Tanaka et al. | 355/16 |
| 3,963,340 | 6/1976 | Gerace | 355/16 X |
| 4,403,853 | 9/1983 | Hovens et al. | 355/3 BE X |
| 4,610,526 | 9/1986 | Aser | 355/3 BE |

FOREIGN PATENT DOCUMENTS

| | | | |
|---|---|---|---|
| 2189438 | 10/1987 | United Kingdom | 355/16 |

*Primary Examiner*—Fred L. Braun
*Attorney, Agent, or Firm*—Guy W. Shoup; Paul J. Winters; Brian D. Ogonowsky

[57] ABSTRACT

A printer which includes a latent image carrier in the form of an endless belt, a carriage moveable parallel to a lengthwise dimension of the endless belt, and a paper transport device for moving a sheet of paper perpendicular to the direction of movement of the belt. Mounted on the carriage is a condition control mechanism for putting the latent image carrier in a condition ready for writing a latent image on it, a writing mechanism for forming a latent image on the latent image carriage, a transfer unit for transferring a toner image from the latent image carrier to a recording medium, and a fixing unit for fixing the toner image on the recording medium. After a write operation, the belt is rotated on-half its length and held immoveable. The carriage, having mounted on it the condition control mechanism, writing mechanism, transfer unit and fixing unit, is then moved in the length direction of the latent image carrier and a concurrent write operation, transferring operation, and fixing operation is conducted on three separate lines of images.

6 Claims, 3 Drawing Sheets

IMPROVED PRINTER ENABLING CONCURRENT WRITING, TRANSFERRING, AND FIXING OPERATIONS ON THE SAME SHEET OF RECORDING MATERIAL

FIELD OF THE INVENTION

This invention relates to a printer for printing letters, symbols,, patterns and others on paper or other recording medium, and more particularly to a small-scaled printer operative at a high speed.

BACKGROUND OF THE INVENTION

As a prior art printer of this type, a page printer represented by a laser printer is used widely.

Such a page printer, as shown in FIG. 8, is configured so that a hopping roller 3 feeds a sheet of paper of B5, A4 or other standard size one after another from a paper supply cassette 1, and as the paper moves along a paper transporting path 4, a mechanism including a sensitive drum 5 and others transfers letters or the like corresponding to printing patterns on the paper. More specifically, the sensitive drum 5 having an axial length larger than the maximum width of the paper 2 is rotated in arrow A direction in FIG. 8, and an electrifier 6 located around the sensitive drum 5 electrifies the sensitive drum 5 uniformly. Subsequently, a photographic writing unit 7 writes an electrostatic latent image corresponding to a printing pattern on the sensitive drum 5, and a developing unit 8 selectively attaches toner to the electrostatic latent image on the sensitive drum 5 to form a toner image. When the toner image reaches a transfer unit 9 during rotation of the sensitive drum 5, it is transferred from the sensitive drum 5 to the paper 2 by an electrostatic attractive force of the transfer unit 9. After this, the paper 2 is detached from the sensitive drum 5 and transported to a fixing unit 10 to thermally or pressingly fix the toner image on the paper 2 therein, and the paper 2 is discharged on a paper discharge tray 11. On the other hand, the sensitive drumb 5 passing through the transfer unit 9 loses the residual electric charge thereon due to operation of a deelectrifier 12, and the remainder of the toner on the sensitive drum 5 is subsequently removed by a cleaner 13.

In the prior art page printer, however, since the sensitive drum 5 has an axial length larger than the width of the paper, the substantially same axial lengths are required for the electrifier 6, photographic writing unit 7, developing unit 8, transfer unit 9, deelectrifier 12, cleaner 13 and others which are located around the sensitive drum 5. This necessarily increases the entire dimension of the page printer, and causes an increase in the manufacturing cost.

In order to overcome the problem, the Assignee of the present application already proposed a small-scaled, inexpensive printer capable of effecting a high-quality printing, using a laten image carrier in the form of an endless belt travelling in the width direction of the paper 2 in lieu of the photosensitive belt 5 having an axial length longer than the width of the paper 2.

The present invenion is proposed in view of these circumstances.

OBJECT OF THE INVENTION

An object of the invention is to provide a printer in which a latent image capable of providing a good final print can be written on a latent image carrier, ensuring a positional repeatability and ensuring a significantly clear print.

A further object of the invention is to provide a high-speed printer.

A still further embodiment of the invention is to provide a printer reducing the energy consumption in transfer and fixture operations.

A yet further object of the invention is to provide a small-scaled printer.

SUMMARY OF THE INVENTION

The invention is directed to a printer comprising: a latent image carrier in the form of an endless belt; a condition control mechanism for establishing a condition of the latent image carrier ready for writing a latent image thereon; a writing mechanism for forming a latent image on the latent image carrier in the ready-for-writing condition; a transfer unit for transferring a toner image formed on the latent image on the latent image carrier to a recording medium; and a fixing unit for fixing the toner image on the recording medium. The inventive printer is characterized in that the condition control mechanism, writing mechanism, transfer unit and fixing unit are movable in the length direction of the latent image carrier, and that the latent image carrier is rotated its full length per every two printing operations.

According to the inventive arrangement, while the latent image carrier is held immovable, the condition control mechanism, writing mechanism, transfer unit and fixing unit are moved together in the length direction of the latent image carrier, so that the condition control mechanim first establishes the ready-for-writing condition of the latent image carrier, and the writing mechanism writes a latent image immediately thereafter. Further, a toner image formed on the latent image written concurrently is transferred to a recording medium by the transfer unit. The fixing unit subsequently fixes the toner image on the recording medium which is held immovable. As a result, letters or other material are printed. Further, while a half part of the latent image carrier in its length direction is used to form the toner image and to subsequently transfer it to the paper, the other half part of the latent image carrier is cleaned to remove the residual toner.

BRIEF DESCRIPTION OF THE DRAWINGS

FIGS. 1 through 3 show a printer embodying the invention in which: FIG. 1 is a front, cross-sectional view; FIG. 2 is a plan view; and FIG. 3 is an enlarged, cross-sectional view taken along III—III line of FIG. 1;

DETAILED DESCRIPTION

The invention is described below, referring to preferred embodiments illustrated in FIGS. 1 through 7.

Figure 1:
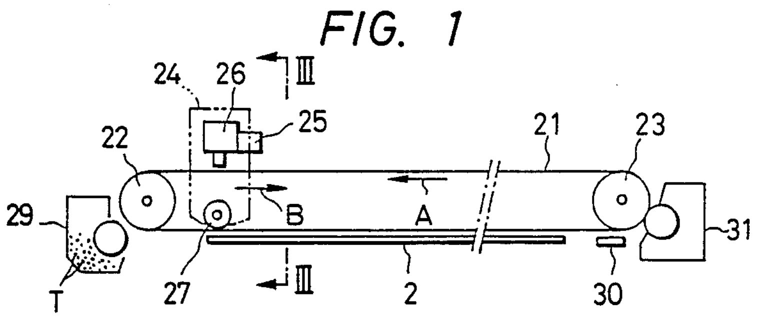
Figure 2:
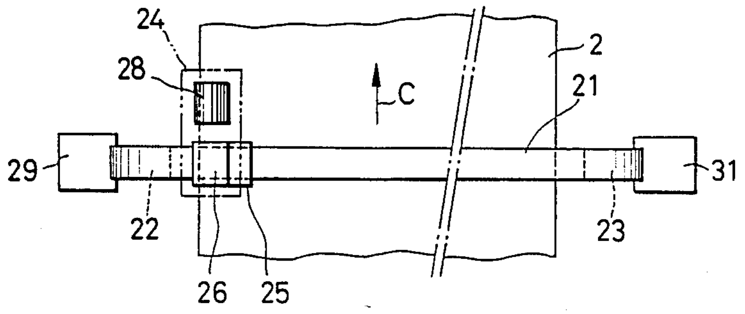
Figure 3:
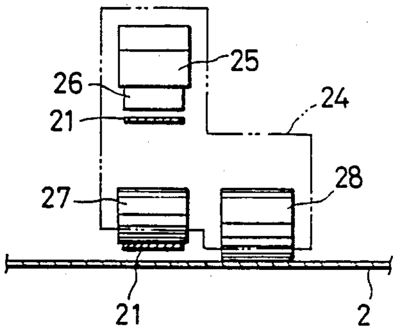

FIGS. 1 through 3 show a first embodiment of the invention.

FIG. 1 shows the entire arrangement of the first embodiment. A printer according to the first embodiment employs a photographic writing method.

As shown in FIG. 1, the printer includes a latent image carrier which is an organic photoconductive (OPC) belt 21 in the form of an endless belt extending between a driving roller 22 and a follower roller 23 so as to travel under a driving force of the driving roller 22 along arrow A in the width direction of a sheet of paper 2 (across the travelling direction of the paper 2). In the first embodiment, the OPC belt 21 has a length which is twice the length for one printing operation, that is, a length for two printing processes.

More specifically, the first embodiment is an example configured to stick toner T on the exterior surface of the OPC belt 21 and transfer a resulting toner image on the paper 2. A carriage 24 is provided between the driving roller 22 and the follower roller 23 reciprocally at least over the width of the paper 2 in the width direction of same. The carriage 24 supports an electrifier 25, photographic writing head 26, transfer roller 27 and fixing roller 28 reciprocally together. The electrifier 25 is an example of a condition control mechanism for making a condition enabling photographic writing on the OPC belt 21, and is configured to negative-electrify the external surface of the upper half of the OPC belt 21, using corona discharge, for example. A photographic writing head 26 is located downstream of the electrifier 25 in the advancing direction of the OPC belt 21 to expose the upper-half, external surface of the OPC belt 21 so as to form an electrostatic latent image having a positive potential, for example, with respect to the non-exposed portion. The photographic writing head 26 includes a light-emitting diode head (hereinafter called "LED head") to form an electrostatic latent image corresponding to a printing pattern. The electrostatic latent image formed on the exterior surface of the OPC belt 21 is provided with toner T in a negative potential at the driving roller 22 by a developing unit 29. The transfer roller 27 is opposed to the interior surface of the lower half of the OPC belt 21 under the carriage 24 to serve as a transfer unit for transferring the toner T from the exterior surface of the OPC belt 21 to the paper 2. That is, the transfer roller 27 is supplied with a negative-potential bias voltage, for example, so that the negative-potential toner T sticks on the paper 2 due to an electrostatic counterforce to form a toner image on the paper. Further, the fixing roller 28 is located under the carriage 24 at a position downstram of the transfer roller 27 in the paper advancing direction by an amount corresponding to one line of letters or others to be printed. The fixing roller 28 serves as a fixing unit for fixing the toner image from the OPC belt 21 to the paper 2, using a pressure or heat. At the position of the follower roller 23 are provided sequentially in the belt advancing direction an electroluminescence or other deelectrifier 30 for removing the residual charge of the OPC belt 21 and cleaner 31 for removing residual toner on the exterior surface of the OPC belt 21.

The first embodiment operates as described below.

The printer prints on the paper one line corresponding to the width of the OPC belt 21, and after feeding the paper 2 by one line, subsequently prints the next one line on the paper 2.

More specifically, while the OPC belt 21 stays still at the initial position of FIG. 1, a print starting instruction is generated.

On receipt of the print starting instruction, a driving mechanism (not shown) moves the carriage 24 in arrow B direction in FIG. 1. Therefore, the electrifier 25, photographic writing head 26, transfer roller 27 and fixing roller 28 are all transported by the carriage in arrow B direction. However, the electrifier 25 and the photgraphic writing head 26 alone are activated first. More specifically, the electrifier 25 negatively electrifies the exterior surface of the upper half of the OPC belt 21 while held immovable so as to establish a condition enabling photographic writing, and the photographic writing head 26 immediately forms an electrostatic latent image corresponding to a first line of printing pattern on the electrified exterior surface of the upper half of the OPC belt 21. Formation of the electrostatic latent image by the photographic writing head 26 is effected in a continuous mode for every line having a length corresponding to the width of the paper 2.

After this, the driving roller 22 is activated to move the OPC belt 21 in arrow A direction of FIG. 1 up to a position where the first-line electrostatic latent image written on the OPC belt 21 is opposed to the paper 2. While the OPC belt 21 moves, the developing unit 29 sticks negative-electrified toner T on the first-line electrostatic latent image on the exterior surface of the OPC belt 21 to form a toner image. Additionally, the carriage 24 is moved back concurrently with the movement of the OPC belt 21 in a direction opposite to arrow B in the drawing up to the initial position.

When the OPC belt 21 reaches a position where the first-line toner image is opposed to the paper 2, it is held there for a time. On the other hand, the carriage 24 when moved back to the initial position, is moved again in arrow B direction of FIG. 1. During the second movement of the carriage 24 in arrow B direction, the first-line toner image precedingly formed on the exterior surface of the lower half of the OPC belt 21 is transferred to the paper 2 sequentially as the transfer roller 27 advances. Simultaneously, the electrifier 25 and photographic writing head 26 are activated to form the second-line electrostatic latent image on the upper half of the OPC belt 21.

Upon completion of toner-image transfer of the first line and electrostatic latent image writing of the second line, the driving roller 22 is activated to feed the OPC belt 21 by a half length thereof and simultaneously moves back the carriage 24 to its initial position. At the same time, a paper feeding mechanism (not shown) feeds the paper 2 by an amount corresponding to one line in arrow C direction of FIG. 2. Further, while the OPC belt 21 moves by an amount corresponding to one line, the developing unit 29 forms the second toner image on the OPC belt 21 in the same fashion as described above. Meanwhile, the deelectrifier 30 removes residual electric charge on the OPC belt 21, and the cleaner 31 subsequently removes residual toner to prepare a clean surface for subsequent formation of another electrostatic latent image.

After this, the carriage 24 is moved again in arrow B direction in FIG. 1, and the electrifier 25 and photographic writing head 26 form a subsequent third line of electrostatic latent image on the OPC belt 21 whereas the transfer roller 27 concurrently transfers the second-line toner image from the OPC belt 21 to the paper 2. When the second-line transfer and the third-line writing are completed, the driving roller 22 is activated to feed the OPC belt 21 and the paper 2 by one line. Subsequently, the first-line toner image precedingly transferred to the paper 2 is fixed by the fixing roller 28 simultaneously with a fourth-line writing and the third-line transfer.

The above-described printing operations are repeated until all letters or other material corresponding to printing instructions are printed on the paper 2.

In the first embodiment, when the transfer roller 27 moves back to its initial position, a pressure-contacting force may be removed by cutting the negative-potential bias, or alternatively, it may be moved upwardly away from the OPC belt 21 so as to prevent an affection of the negative potential.

Figure 4:
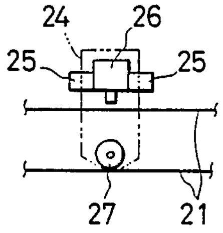
FIG. 4 is a front elevation of a carriage unit in a further embodiment of the invention.

Further, as shown in FIG. 4, two electrifiers 25—25 may be provided at opposite sides of the photographic writing head 26 in the length direction of the OPC belt 21 so that electrification by the electrifier 25, writing by the photographic writing head 26, transfer by the transfer roller 27 and fixture by the fixing roller 8 are performed in movements of the carriage 24 in both the arrow B direction and the opposite direction. In this case, the carriage 24 is held immovable while the driving roller 22 feeds the OPC belt 21 by one line.

In the first embodiment, printing is effected for every single line. However, lengths of respective units or devices in the line direction may be increased so as to print several lines simultaneously.

According to the first embodiment, since the electrifier 25 is disposed adjacent the photographic writing head 26 to form a unitary assembly, the electrifier 25 and the head 26 are moved together while the OPC belt 21 is held immovable so that the photographic writing head 26 can expose the OPC belt 21 to write an electrostatic latent image just after the electrifier 25 electrifies the OPC belt 21. This eliminates an attenuation of the OPC belt 21, i.e. a decrease in the electrified potential of the OPC belt 21 with time. Therefore, it ensures an electrostatic latent image of a proper potential and a proper density of the toner image. This improves the clearness of the final printing. Additionally since electrification of and writing of the OPC belt 21 are performed simultaneously, the starting time taken from a print starting instruction until initiation of a printing operation is reduced, and a high-speed printing is attained. Further, electrostatic latent images are always formed at a predetermined exact position on the OPC belt 21, and this ensures a qualified, clear final print on the paper 2. Beside this, since it is easy to maintain a uniform speed for moving the electrifier 25 and the photographic writing head 26 on the carriage 24, the printer further improves the accuracy of electrostatic latent images. Further, writing of electrostatic images is never degraded regardless of a possible irregular rotation of the OPC belt 21 because it is performed while the OPC belt 21 is held immovable. Further, the time required from completion of writing of an electrostatic latent image by the photographic writing head 26 and a movement of the OPC belt 21 until development by the developing unit 29 can be the time required for an acceptable decrease of the electrified potential (about 0.6 seconds, for example).

In the first embodiment, since the photographic writing head 26 and the transfer roller 27 are supported in a unitary configuration by the carriage 24, writing of an electrostatic latent image on the OPC belt 21 is performed simultaneously with transfer of a toner image from the OPC belt 21 to the paper 2. This improves the time efficiency, and establishes a high-speed printing. Further, since the transfer roller 27 in the inventive printer is configured to transfer a toner image of one line, moving the OPC belt 21 in its length direction, it may be small-scaled as compared to a transfer device configured to transfer one line simultaneously at a stroke. At the same time, the electric energy required for attaching toner T from the OPC belt 21 to the paper 2 is much less than that required in a printer configured to transfer one entire line of toner image simultaneously. This greatly reduces energy consumption.

Further, since the first embodiment employs an arrangement in which the fixing roller 28 is supported in a unitary configuration with the electrifier 25, photographic writing head 26 and transfer roller 27 so that the fixing roller 28 can be small-scaled as compared to a fixing unit configured to fix one line of toner image simultaneously at a stroke. This contributes to a scale reduction of the entire printer. Further, electric energy required for fixture is largely reduced as compared to that required in a printer configured to fix one entire line simultaneously. This decreases energy consumption. Additionally, a series of printing processes is reliably effected and provides a clear print on the paper. Further, since the OPC belt 21 is as short as corresponding to two printing operations, the printer is entirely small-scaled. Since the OPC belt 21 rotates one exact turn in two printing operations, it never invites a problem that the junction of the OPC belt 21 gradually changes its position during repeated printing operations and a problem that an electrostatic latent image is formed on the junction.

Figure 5:
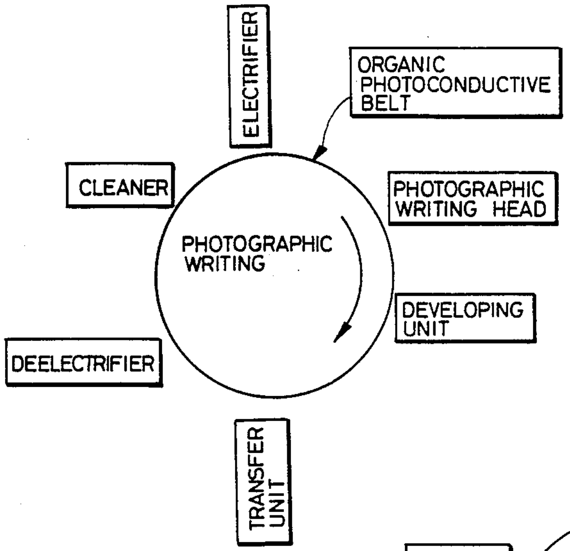
FIGS. 5 through 7 are block diagrams schematically showing an embodiment of the invention.

The first embodiment employs a photographic writing method which is shown in a block diagram of FIG. 5.

Figure 6:
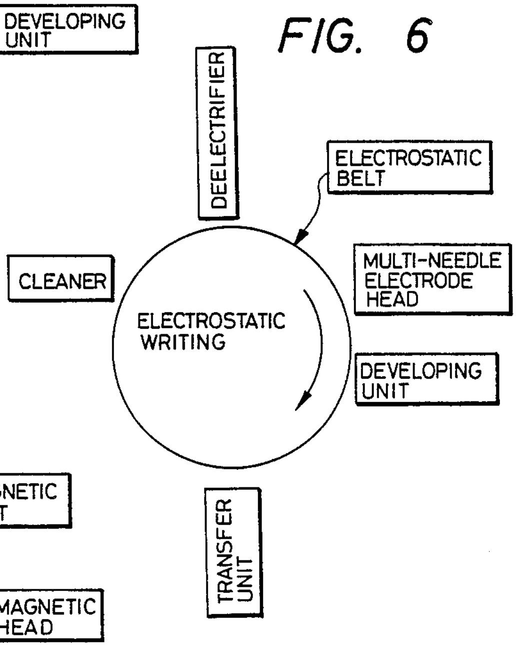
Figure 7:
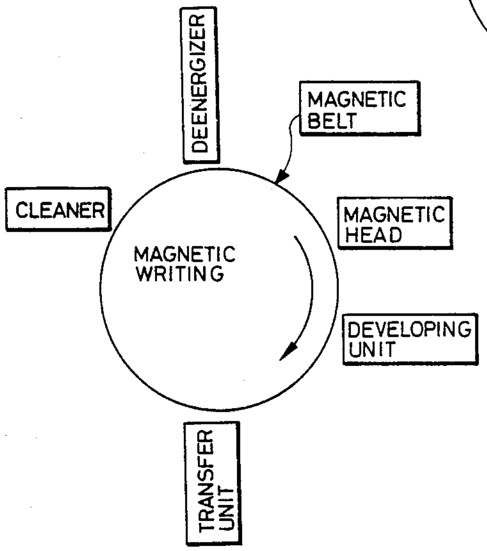
Figure 8:
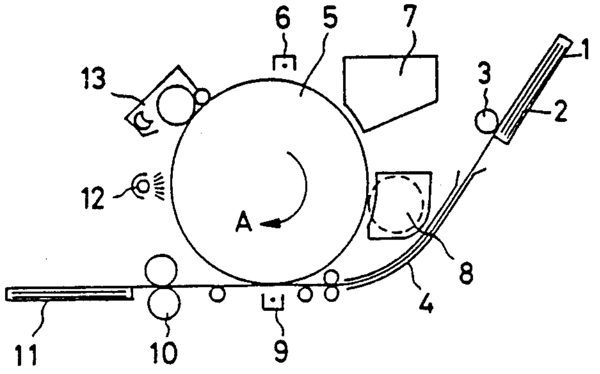
FIG. 8 PRIOR ART
FIG. 8 is a longitudinally acrossing side elevation which schematically shows a prior art page printer.

The invention, however, may employ an electrosatic printing method of FIG. 6 or a magnetic printing method of FIG. 7.

In the electrostatic method of FIG. 6, an electrostatic belt in the form of an endless belt is used as a latent image carrier. A deelectrifier which is a condition control mechanism removes an electric potential from the electrostatic belt. A multi-needle electrode head writes a latent image electrostatically on the no-potential belt. A developing unit forms a toner image on the latent image, and a transfer unit transfers the toner image to a sheet of paper. After this, a cleaner removes residual toner remaining on the electrostatic belt after a transfer operation, and the deelectrifier removes residual potential on the belt for use in a subsequent printing cycle.

In the magnetic method of FIG. 7, a magnetic belt in the form of an endless belt is used as a latent image carrier. A deenergizer which is a condition control mechanism removes a magnetism on the magnetic belt. A magnetic head magnetically writes a latent image on the deenergized belt. Subsequently, a developing unit forms a toner image on the latent image, and a transfer unit transfers the toner image to a sheet of paper. After this, a cleaner removes residual toner remaining on the magnetic belt after a transfer operation, and a deenrgizer deenergizes the magnetic belt for use in a subsequent printing cycle.

The invention is not limited to the aforegoing embodiments, but may be modified variously if necessary.

As understood from the aforegoing description, the inventive printer using a latent image carrier in the form of an endless belt ensures writing of a latent image on the latent image carrier under a high positional repeatability so as to provide an excellent final print, improves the writing accuracy, improves the quality of printed letters, etc., establishes a high-speed print, reduces the energy for transfer and fixture, and contributes to a scale reduction of the printer.

What is claimed is:

1. A printer comprising:

an endless belt latent image carrier, said endless belt having a width dimension shorter than a length dimension of a sheet of recording material to be printed upon;

a carriage moveable parallel to a lengthwise dimension of said endless belt;

a latent image forming means including an image writing means mounted on said carriage, said image writing means for selectively energizing a portion of said endless belt to form a latent image on said endless belt when said belt is held motionless during a write operation;

a developer means fixed in position for forming a toner image, corresponding to said latent image, on said endless belt;

a transferring means mounted on said carriage for transferring said toner image from said endless belt to said sheet of recording material to be printed upon;

a fixing means mounted on said carriage adjacent to said transferring means for fixing said toner image transferred to said sheet of recording material;

an endless belt transporting means for transporting said endless belt in its lengthwise direction, said transporting means holding said endless belt motionless during said write operation, a transfer operation, and a fixing operation, said endless belt transporting means transporting said endless belt its full length during two of said writing operations;

a recording material transporting means for transporting said sheet of recording material in a direction perpendicular to the direction of movement of said endless belt, said recording material transporting means moving said sheet of recording material intermittently in increments and holding said paper motionless during said write operation, said transfer operation, and said fixing operation;

a carriage transporting means for transporting said carriage parallel to a lengthwise dimension of said endless belt, said carriage transporting means for moving said carriage with respect to said endless belt during said write operation, said transferring operation, and said fixing operation when said endless belt is held motionless; and an activating means for selectively activating said latent image forming means, said transferring means, and said fixing means so that after three write operations, as said carriage is moved with respect to a motionless endless belt, said image forming means forms a first latent image on said endless belt concurrently with said transferring means transferring a toner image to said sheet of recording material and concurrently with said fixing means fixing a previously transferred image to said sheet of recording material.

2. The printer of claim 1 wherein said endless belt is a photoconductive belt.

3. The printer of claim 2 wherein said latent image forming means further comprises a belt charging means for putting said belt in a charged condition before being written upon by said image writing means.

4. The printer of claim 3 wherein said image writing means is a write head.

5. The printer of claim 1 wherein said endless belt is an electrostatic belt.

6. The printer of claim 1 wherein said endless belt is a magnetic belt.

* * * * *